(12) United States Patent
Sportel et al.

(10) Patent No.: US 11,492,019 B2
(45) Date of Patent: Nov. 8, 2022

(54) TUBE SEGMENT AND TUBE FOR EVACUATED TUBE TRANSPORT SYSTEM

(71) Applicant: TATA STEEL NEDERLAND TECHNOLOGY B.V., Velsen-Noord (NL)

(72) Inventors: Heiko Sportel, Heiloo (NL); Paul Alexander De Vries, Beverwijk (NL); Mark Bernard Denys, Akersloot (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 195 days.

(21) Appl. No.: 16/965,768

(22) PCT Filed: Jan. 24, 2019

(86) PCT No.: PCT/EP2019/051689
§ 371 (c)(1),
(2) Date: Jul. 29, 2020

(87) PCT Pub. No.: WO2019/149604
PCT Pub. Date: Aug. 8, 2019

(65) Prior Publication Data
US 2020/0361498 A1    Nov. 19, 2020

(30) Foreign Application Priority Data

Jan. 31, 2018 (EP) .................................. 18154548

(51) Int. Cl.
*B65G 51/18* (2006.01)
*B61B 13/10* (2006.01)
*B21C 37/15* (2006.01)
*B61B 13/12* (2006.01)
*B65G 51/03* (2006.01)
*B65G 54/02* (2006.01)

(52) U.S. Cl.
CPC .............. *B61B 13/10* (2013.01); *B21C 37/15* (2013.01); *B61B 13/122* (2013.01); *B65G 51/03* (2013.01); *B65G 51/18* (2013.01); *B65G 54/02* (2013.01)

(58) Field of Classification Search
None
See application file for complete search history.

(56) References Cited

U.S. PATENT DOCUMENTS

| 1,020,942 A | 3/1912 | Emile | |
|---|---|---|---|
| 3,636,985 A * | 1/1972 | Burchett | F16L 9/22 138/117 |

(Continued)

FOREIGN PATENT DOCUMENTS

| CN | 101837789 A | 9/2010 |
|---|---|---|
| DE | 2435559 A1 | 2/1976 |

(Continued)

OTHER PUBLICATIONS

International Search Report and Written Opinion dated Apr. 9, 2019 for PCT/EP2019/051689 to Tata Steel Nederland Technology B.V. filed Jan. 24, 2019.

*Primary Examiner* — Joseph A Dillon, Jr.
(74) *Attorney, Agent, or Firm* — Vorys, Sater, Seymour and Pease LLP (57) ABSTRACT

A method for producing a tube segment and a tube for an evacuated tube transport system and a method for producing the tube segment.

20 Claims, 4 Drawing Sheets

(56) References Cited

U.S. PATENT DOCUMENTS

| | | | | |
|---|---|---|---|---|
| 3,694,892 | A * | 10/1972 | Hale | B21D 13/045 29/564.2 |
| 3,886,981 | A * | 6/1975 | Eliason | B21C 37/09 138/149 |
| 5,393,105 | A * | 2/1995 | Petterson | F16L 11/121 285/47 |
| 5,950,543 | A | 9/1999 | Oster | |
| 8,206,821 | B2 * | 6/2012 | Librizzi | F16L 9/003 428/36.5 |
| 8,950,439 | B2 * | 2/2015 | Dudley | F16L 59/026 138/158 |
| 9,618,144 | B2 * | 4/2017 | Wallin | F24F 13/0245 |
| 10,627,021 | B2 * | 4/2020 | Smith | F16L 9/006 |
| 10,648,152 | B2 * | 5/2020 | Zhan | F16L 9/003 |
| 10,724,658 | B2 * | 7/2020 | Rosèn | B21C 37/202 |
| 10,760,420 | B2 * | 9/2020 | Ianni | E21F 1/006 |
| 10,786,942 | B2 * | 9/2020 | Voelkle | F16L 9/14 |
| 10,948,108 | B2 * | 3/2021 | Yang | F16L 27/111 |
| RE49,087 | E * | 5/2022 | Duffy | F24F 13/0209 |
| 2006/0213572 | A1 * | 9/2006 | Beaulieu | F16L 59/166 138/155 |
| 2014/0110014 | A1 * | 4/2014 | Rowan | F16L 23/14 138/149 |
| 2014/0227468 | A1 * | 8/2014 | Wallin | F16L 9/128 428/36.1 |
| 2018/0093421 | A1 * | 4/2018 | Mori | F16L 9/22 |
| 2019/0246577 | A1 * | 8/2019 | Masarwa | F16L 9/127 |
| 2021/0140567 | A1 * | 5/2021 | Reneau | F16L 9/22 |
| 2021/0163045 | A1 * | 6/2021 | De Vries | B61B 13/10 |
| 2021/0291880 | A1 * | 9/2021 | Wyman | F16L 9/18 |
| 2021/0324685 | A1 * | 10/2021 | Rudolph | E21B 7/208 |

FOREIGN PATENT DOCUMENTS

| | | |
|---|---|---|
| EP | 0242157 A1 | 10/1987 |
| JP | H08296398 A | 11/1996 |
| JP | 3239289 B2 | 12/2001 |
| JP | 2002122000 A | 4/2002 |
| WO | 9919195 A1 | 4/1999 |
| WO | 2012077941 A2 | 6/2012 |

* cited by examiner

TUBE SEGMENT AND TUBE FOR EVACUATED TUBE TRANSPORT SYSTEM

CROSS-REFERENCE TO RELATED APPLICATIONS

This is a § 371 National Stage Application of International Application No. PCT/EP2019/051689 filed on Jan. 24, 2019, claiming the priority of European Patent Application No. 18154548.4 filed on Jan. 31, 2018.

FIELD OF THE INVENTION

This invention relates to a method for producing a tube for an evacuated tube transport system and to a method for producing said tube segment. A hyperloop is a proposed mode of passenger and/or freight transportation, first used to describe an open-source vactrain design released by a joint team from Tesla and SpaceX. Drawing heavily from Robert Goddard's vactrain, a hyperloop comprises a sealed tube or system of tubes through which a pod may travel free of air resistance or friction conveying people or objects at high speed and acceleration. Elon Musk's version of the concept, first publicly mentioned in 2012, incorporates reduced-pressure tubes in which pressurized capsules ride on air bearings driven by linear induction motors and air compressors. The tubes would run above ground on columns or below ground in tunnels to avoid the dangers of grade crossings. The concept would allow travel which is considerably faster than current rail or air travel times. An ideal hyperloop system will be more energy-efficient, quiet, and autonomous than existing modes of mass transit.

BACKGROUND OF THE INVENTION

Developments in high-speed rail have historically been impeded by the difficulties in managing friction and air resistance, both of which become substantial when vehicles approach high speeds. The vactrain concept theoretically eliminates these obstacles by employing magnetically levitating trains in evacuated (airless) or partly evacuated tubes, allowing for very high speeds. The principle of magnetic levitation is disclosed in U.S. Pat. No. 1,020,942. However, the high cost of magnetic levitation and the difficulty of maintaining a vacuum over large distances has prevented this type of system from ever being built. The Hyperloop resembles a vactrain system but operates at approximately one millibar (100 Pa) of pressure and can therefore be described as an evacuated tube transport (ETT) system as disclosed in general terms in U.S. Pat. No. 5,950,543.

An Evacuated Tube Transport system (ETT) solves many problems associated with classic transport by moving all obstacles from the path of travel and not allowing their return. Once the path is evacuated and free from obstacles, travel can take place unimpeded. The object traveling (in this case a capsule) is in a tube so it stays on the intended path and no obstacles can get on the path. If subsequent capsules undergo identical acceleration and deceleration, many capsules can travel the same direction in the tube at once with complete safety. Acceleration and deceleration are planned to prevent the capsule from becoming an obstacle to subsequent capsules. The reliability of the capsules is very high due to minimal or no reliance on moving parts. Most of the energy required to accelerate is recovered during deceleration.

One of the important elements of an ETT-system is the tube. These tubes require a large diameter for allowing the pods containing the freight or passengers to pass through. The main requirement of the tube is that it must be evacuated. The pressure in the tube is about 100 Pa, so it must be able to withstand the pressure from the surrounding atmosphere. The atmospheric pressure is about 101 kPa, so about 1000 times the pressure in the tube. As the tubes above ground would often be supported (e.g. by columns) the tube must also be able to span the gap between two supports without bending or buckling. According to the full proposal of the Hyperloop Alpha project a tube wall thickness between 20 to 23 mm is necessary to provide sufficient strength for the load cases considered such as pressure differential, bending and buckling between pillars, loading due to the capsule weight and acceleration, as well as seismic considerations for a passenger tube. For a passenger plus vehicle tube the tube wall thickness for the larger tube would be between 23 to 25 mm. These calculations are based on a tube having an internal diameter of 3.30 mm. However, calculations have also shown that the economics of the ETT-system can be much improved by increasing the pod size travelling through the tube. These increased pod sizes require an internal diameter in the order of 3.50 to 5.00 meter. If these diameters of tube are produced from steel, then this requires a thickness in the order of 30 mm. No hot strip mill is able to supply material of this thickness, and therefore these tubes would have to be produced from plate. With the proposed wide spread use of the ETT system and steel as the preferred material for the tube, this would require approx. 3000 ton/km×20000 km=60 Mton. Currently the total production of plate in EU28 is about 10 Mton/year. Apart from this capacity problem it is clear that producing tubes from plate requires an enormous amount of cumbersome handling and shaping on-site and welding of the plate, as well as that the tubes become very heavy. A 5 m diameter tube of 30 mm thick steel weighs 3700 kg/m, meaning that segments of 10 m weigh 37 tonnes. The payload of a Mi-26 helicopter is about 22 tonnes. Transport via the road is impractical in view of viaducts or other restrictions.

SUMMARY OF THE INVENTION

It is the object of the invention to provide a tube for an ETT-system that is lighter than a conventionally produced tube.

It is a further object of the invention to provide a tube for an ETT-system that can be produced on-site.

It is a further object of the invention to provide a tube for an ETT-system that can be transported over the road easily.

This invention relates to an evacuated tube transport system tube which is adapted and configured for near vacuum use, comprising a plurality of tube segments and method of using same. The invention also relates to a method for producing a tube for an evacuated tube transport system and to a method for using a tube for an evacuated tube transport system.

DETAILED DESCRIPTION OF THE INVENTION

One or more of these object is reached with an Evacuated tube transport system tube which, in use, is near vacuum, comprising a plurality of tube segments (1) for constructing an evacuated tube transport system wherein the tube segments have an exterior side (1') and an interior side (1") characterised in that each the tube segment is composed of a plurality of prefabricated steel tube wall parts (2) wherein the parts comprise an essentially quadrangular portion (3) having an outwardly facing surface (3') in the direction of the exterior of the tube segment and an inwardly facing surface (3") in the direction of the interior of the tube segment, said portion having two tangential edges (4, 5) and two axial edges (6, 7), wherein at least the axial edges (6, 7) are provided with flanges (8) along one or both edges (6, 7). In an embodiment only the axial edges (6,7) are provided with flanges (8) along one or both edges and the tangential edges (4,5) are not provided with flanges. Preferable embodiments are provided in the dependent claims. The evacuated tube transport system tube is, in use, near vacuum. In the context of this invention wherein the pressure outside the tube is the atmospheric pressure of about 101 kPa (1 bar), near vacuum means that the pressure inside the tube is less than 10 kPa (≈0.1 bar), preferably less than 1 kPa (≈0.01 bar or 10 mbar), even more preferably less than 500 Pa (≈5 mbar) or even 200 Pa (≈2 mbar), or even about 100 Pa (≈1 mbar).

The invention is also embodied in a method of making an Evacuated tube transport system tube and a method of using an Evacuated tube transport system tube.

The tube segment according to the invention allows for the production of a tube for an ETT on location using parts that can be constructed off site and transported to the building site relatively easily because the prefabricated steel tube wall parts are relatively small and can be transported on trucks etc. It is also possible to produce them on site because the starting material is a coil of hot rolled steel. The way the tube segments are constructed mimics the use of thicker steels by the use of stiffening flanges, stiffening ribs and stiffening rings.

The tube segment according to the invention is suitable for constructing an evacuated tube transport system. However, the specific properties of the tube segment, and in particular its ability to perform under conditions wherein the pressure exerted on it from outside the tube produced from these tube segments is significantly higher than the pressure in the tube make it also suitable for the application of tubes operating under similar pressure conditions. Examples of these applications are underground or underwater tunnels for traffic such as bicycle tunnels, car tunnels, train tunnels, maintenance tunnels or shafts, tubes in hydro-electric power stations, gas storage systems in which underpressure occurs or may occur, etc.

According to a first aspect a tube segment for constructing an evacuated tube transport system wherein the tube segment has an exterior side and an interior side characterised in that the tube segment is composed of a plurality of prefabricated steel tube wall parts wherein the parts comprise an essentially quadrangular portion having an outwardly facing surface in the direction of the exterior of the tube segment and an inwardly facing surface in the direction of the interior of the tube segment, said portion having two tangential edges and two axial edges, wherein at least the axial edges are provided with flanges along one or both edges.

The flanges edges are preferably along at least part of the length of both of the axial edges and more preferably along the entire length of one or both of the axial edges. The more flanges are present, the higher the stiffening potential.

The essentially quadrangular portion comprises portions that are a square, a rectangle (FIG. 4A), a trapezoid (FIG. 4B), a parallelogram, a rhombus or a flat concave.

The tube segment and the resulting tube portion have an annular cross-section, preferably a substantially circular cross-section. The flat paneled prefabricated steel tube wall parts will give an impression of circularity because of the many panels needed to construct the wide tube required for ETT-transport.

The invention is also embodied in a method of producing a tube segment for an evacuated tube transport system comprising the steps of:
Producing a hot rolled steel strip by hot-rolling having a suitable thickness and properties for producing the prefabricated steel tube wall parts;
Optionally pickling the hot rolled steel strip;
Optionally providing the hot rolled steel strip with a metallic coating, e.g. by hot dip galvanizing.
Cutting a blank for producing the prefabricated steel tube wall parts from the hot rolled steel strip;
Forming the blank into the prefabricated steel tube wall parts by providing the flanges on the axial edges, and 1. providing the optional kink or kinks in the axial direction, and/or
2. providing the optional curvature in the tangential direction and/or
3. providing the optional stiffening rib or ribs in the axial direction e.g. by roll forming, Attaching the axial edges of prefabricated steel tube wall parts to the abutting axial edge of adjacent prefabricated steel tube wall parts to form a complete annular tube segment (1), Optionally providing the strip, prefabricated steel tube wall parts or tube segment with an organic coating.

The order of the steps in the method is not fixed. The coating of the strip, prefabricated steel tube wall parts or tube segment with an organic coating can be performed at any convenient time during the process.

In a specific embodiment the blank for the prefabricated steel tube wall parts is provided with curved axial edges, and said blank is pressed into a curved shape provided with flanges on the axial edges (inwardly, or outwardly, or mixed) to produce prefabricated steel tube wall parts that, after attaching the axial edges of prefabricated steel tube wall parts to the abutting axial edge of adjacent prefabricated steel tube wall parts forms a tapered tube segment suitable for producing a concave tube portion, preferably a catenoid tube portion. Preferably the prefabricated steel tube wall parts allow the formation of a concave tube portion, preferably a catenoid tube portion using only one set of full length prefabricated steel tube wall parts, e.g. as depicted schematically in FIG. 6 and described herein below. Concave tubes are believed to have an advantage in increasing the buckling strength of the tube, so that the tube may be constructed lighter.

The tube for the ETT, produced by linking together tube segments according to the invention can be underground, on the ground, or over-ground supported by pillars or the like, or over-ground and completely supported over its entire length. If the tube is supported by pillars, then the tube has to be self-supporting between the pillars without buckling. If the tube is supported over its entire length, then the tube does not require to be self-supporting because it is supported everywhere. It would then only have to withstand the vacuum and the operational stresses. The risk of buckling would be greatly reduced, and therefore the tube can be constructed lighter.

The invention is further explained by means of the following, non-limiting figures.

Figure 1:
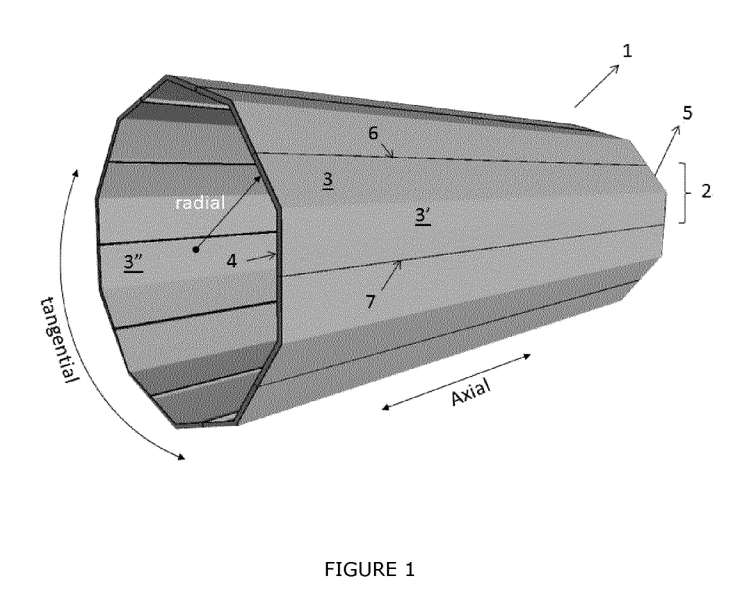
FIG. 1 shows a tube segment 1 for constructing an evacuated tube transport system.

In FIG. 1 a tube segment 1 for constructing an evacuated tube transport system is shown wherein the tube has an exterior side 1' and an interior side 1" characterised in that the tube is composed of a plurality of prefabricated steel tube wall parts 2 wherein the parts comprise an essentially quadrangular portion 3 having an outwardly facing surface 3' in the direction of the exterior of the tube and an inwardly facing surface 3" in the direction of the interior of the tube, said quadrangular portion having two tangential edges 4, 5 and two axial edges 6, 7, wherein at least the axial edges 6, 7 are provided with flanges 8 along one or both edges 6, 7. The primary purpose of the flanges is to provide a stiffening of the tube segment. The length of the prefabricated steel tube wall parts 2 is not limited to a particular size. The parts are normally produced from hot rolled strip and taken out in the length direction of the strip. For instance, if a 30 m long tube segment is supported at both ends, the stiffening flanges have to ensure that the tube segment stays straight. The flanges may also serve as points for attaching peripheral equipment to, such as cabling, or support structures for the track.

One or more of the flanges 8 may be provided with an additional flange. This additional flange may be fully bent, thereby effectively doubling the thickness of the flange, or the additional flange may be bent less than fully e.g. under an angle of about 90° with respect to flange 8 (see FIG. 10B).

The material used for producing the prefabricated steel tube wall parts is hot-rolled steel strip. This is usually provided in the form of coils having a coil weight of typically 20-40 tonnes, and can be supplied in thicknesses up to 25 mm nowadays. The maximum width of these hot rolled coils is over 2 meters. The steel type used for the prefabricated steel tube wall parts can be any hot-rolled strip steel that provides the required properties. It may be beneficial to use a steel known as corten steel because this steel, aka weathering steel, does not require coating. The oxide forming on its surface protects the steel from further corrosion. The more stiffening can be provided to prevent buckling, the thinner the steel strip that can be used. If the strip is sufficiently thin a hot-dip galvanised steel may be used. The thicker the strip the more difficult it is to hot-dip galvanise because of the bending of the strip during the galvanising process. It is also possible to use a product called Coretinium® which consists of two steel skin sheets between which a polymer core is sandwiched. This polymer core may be a solid polymer core, or a honeycomb type of core, which is much lighter than the same equivalent thickness of steel, and provides good stiffness.

The tube segment as depicted in FIG. 1 could also be made using prefabricated steel tube wall parts according to the invention by staggeredly attached prefabricated steel tube wall parts along the length of the axial edges, or along the length of the tangential edges, comparable to how a brick wall would be built. For tube segments with constant cross-sections prefabricated steel tube wall parts with a rectangular portion (3) would preferably be used.

FIG. 1 shows an annular tube segment of constant cross section and diameter. This type of tube segment can be made using prefabricated steel tube wall parts with a rectangular portion 3, or with a square portion 3, with rhombus or parallelogram-shaped portions 3, or with alternately oriented tapered portions 3 (e.g. as depicted in FIG. 4E).

The tube segment can be produced by attaching the axial edge (6) of a plurality of prefabricated steel tube wall parts to the abutting axial edges (7) of adjacent prefabricated steel tube wall parts by:

fastening means (9) working on the flanges (8) of the abutting prefabricated steel tube wall parts, wherein preferably the fastening means comprise releasable fastening means such as nuts and bolts, or by welding the two abutting axial edges (6,7) of the abutting prefabricated steel tube wall parts together and/or welding the flanges (8) of the abutting prefabricated steel tube wall parts together.

Figure 9:
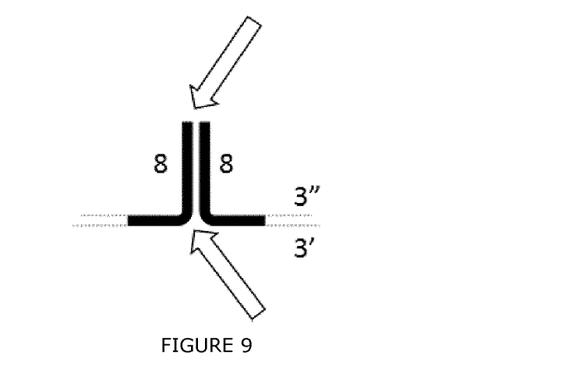
FIG. 9 shows a situation where abutting prefabricated steel tube wall parts are both provided with flanges.

FIG. 9 shows the situation where the abutting prefabricated steel tube wall parts are both provided with flanges 8, and wherein the arrows indicate potential welding spots. The welding can also be done on both spots. Note that the welding preferably takes place along the length of the edge or flanges so provide a sealed tube segment.

The essentially quadrangular portion of the prefabricated steel tube wall parts may be curved so as to enable the final tube to be substantially cylindrical or concave. For increase of stiffness kinks could be provided in the curved portion.

As the tube is to be near vacuum in use, the connections between two adjacent and abutting prefabricated steel tube wall parts have to be airtight. This airtight connection can be achieved by welding the parts together along its axial edges 6, 7. This welding can be done on the interior side or the exterior side (or both). The advantage of welding on the interior side it that the prefabricated steel tube wall parts can be finished and coated under controlled conditions in the factory, whereas the welding in the field can also take place under relatively controlled conditions as it is on the inside of the tube. The ingress of moisture from the outside into the gap where the prefabricated steel tube wall parts abut can be prevented by use of a seal or sealant. The welding will add to the stiffness.

Figure 2:
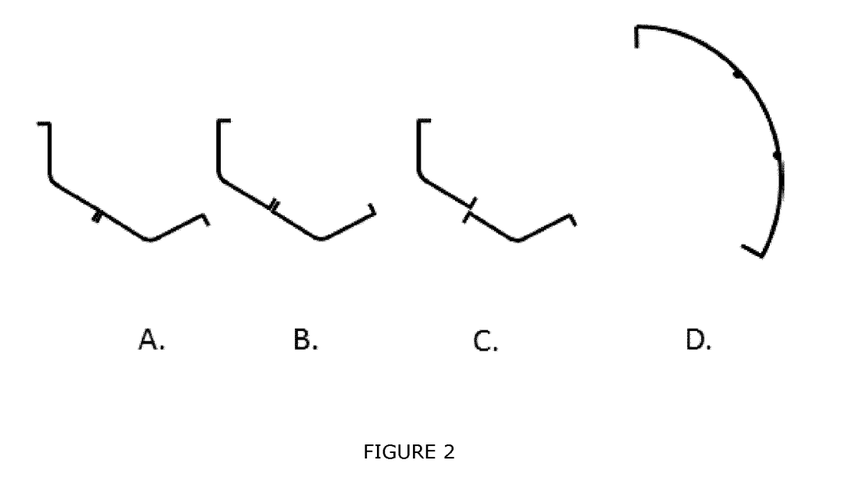
FIG. 2A shows an embodiments for the shape of the prefabricated steel tube wall parts in cross-section that could be welded or bolted.
FIG. 2B shows an embodiments for the shape of the prefabricated steel tube wall parts in cross-section that could be welded or bolted.
FIG. 2C shows an embodiments for the shape of the prefabricated steel tube wall parts in cross-section that cannot be bolted.
FIG. 2D shows an embodiments for the shape of the prefabricated steel tube wall parts in cross-section that has a differently shaped cross-section, strengthened with additional inwardly directed folds or stiffening ribs in the curved quadrangular portion of the prefabricated steel tube wall part.
Figure 3:
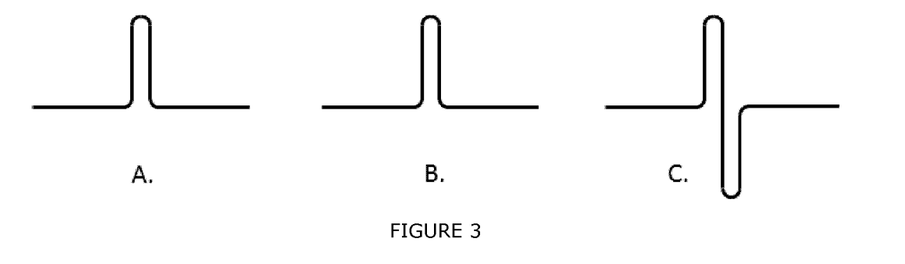
FIG. 3A shows a schematic type fold or stiffening rib.
FIG. 3B shows a schematic type fold or stiffening rib.
FIG. 3C shows a schematic type fold or stiffening rib.
FIG. 3D shows a prefabricated steel tube wall part.

Another connection method that is rigid and airtight is to introduce a sealant (e.g. a rubber) between the flanges of the two adjacent and abutting prefabricated steel tube wall parts and bolting the flanges together. The advantage of bolting is that it the connection is easier to undo in case of emergency or repair. FIG. 2 shows a number of embodiments for the shape of the prefabricated steel tube wall parts in cross-section. In FIGS. 2A and B two configurations are shown that could be welded or bolted. Configuration 2C as depicted cannot be bolted because the flanges 8 point away from each other where the prefabricated steel tube wall parts abut. Figure A shows the prefabricated steel tube wall parts with all flanges directed towards the exterior of the tube segment, Figure B shows all flanges directed towards the interior of the tube segment, Figure C shows flanges directed towards the interior and the exterior of the tube segment and Figure D shows a differently shaped cross-section, in this example strengthened with additional inwardly directed folds or stiffening ribs in the curved quadrangular portion of the prefabricated steel tube wall part (see FIGS. 3A and B for a schematic type fold). These stiffening ribs may also be directed outwardly, or some outwardly and some inwardly and even a combination is possible (FIG. 3C). These folds or stiffening ribs may even serve as a kind of dilatation seam for thermal expansion. The prefabricated steel tube wall part of Figure D can also be produced by welding multiple plates in axial direction to form prefab elements as large as possible whilst still allowing ease of transport and minimising assembly effort in the field. In that case the thicker parts on the interior may be the results of the welding process. The flanges will support assembly in the field.

When producing a tube by joining annular tube portions produced from a plurality of the tube segments the annular tube portions can be connected by welding the abutting tube portions where the tube portions abut. Preferably an annular flange is provided around the edge of the tube portions to facilitate abutment, connection and vacuum sealing of the final ETT. These flanges may be produced by introducing tailored rings, or the flange may be made up of flanges produced at the edges 4, 5 of the quadrangular portions (see FIGS. 1 and 4A).

Figure 4:
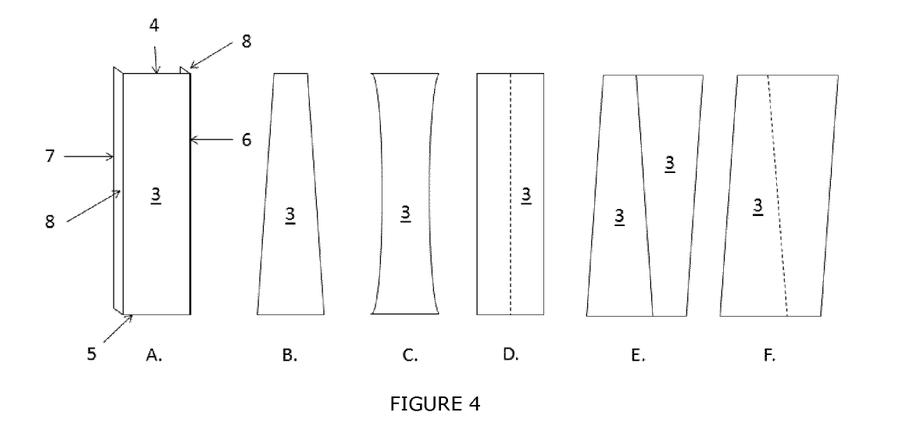
FIG. 4A to F shows 6 different possibilities for the quadrangular portion in the prefabricated steel tube wall part. A rectangular (FIG. 4A), a trapezium isosceles (FIG. 4B), a concave portion (FIG. 4C), a rectangular with a kink (dashed line) (FIG. 4D), a parallelogram (FIG. 4E) built from a combination of two trapezium isosceles and a one part parallelogram (FIG. 4F).

FIG. 4 shows a snapshot from the plethora of shapes that is embodied in the invention. FIG. 4A to F shows 6 different possibilities for the quadrangular portion in the prefabricated steel tube wall part. A rectangular (A), a trapezium isosceles (B), a concave portion (C), a rectangular with a kink (dashed line) as in the cross-sections of FIGS. 2A and B (D), a parallelogram (E) built from a combination of two trapezium isosceles and a one part parallelogram (F), in this case with a kink (dashed line). These kinks run essentially in the axial direction of the quadrangular portion, albeit not necessarily parallel with the edges 6,7 of the quadrangular portion. With parts A an annular tube segment can be produced with a constant diameter, the diameter depending on the angle of the flanges 8 to the quadrangular portion. With prefabricated steel tube wall parts B a tapered tube segment can be produced, or an annular tube segment with a constant diameter when used as in FIG. 4E. The use of prefabricated steel tube wall parts of FIG. 4F also results in an annular tube segment with a constant diameter.

Figure 5:
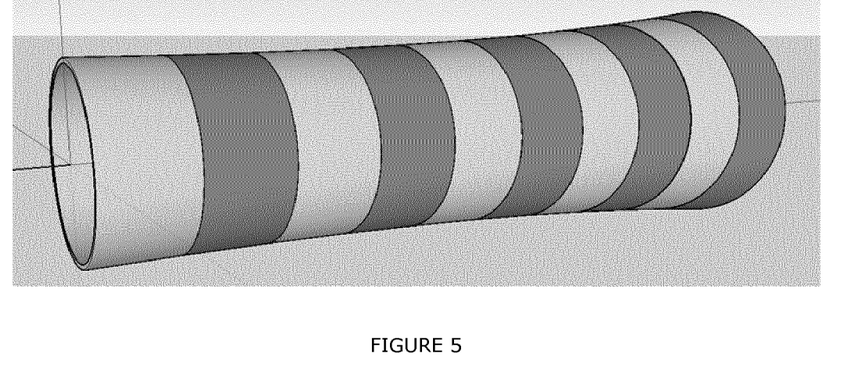
FIG. 5 shows a tube portion is depicted comprising (in this example) ten annular tube segments.

In FIG. 5 a tube portion is depicted comprising (in this example) ten annular tube segments produced according to the invention. Note that the connections between the prefabricated steel tube wall parts in each of the ten segments are not drawn. The annular tube portions again may have flanges as described earlier for the axial segments. These tube segments may have an identical and constant diameter, thus leading to a tube portion that has an identical diameter over its length, or they may be tapered in such a way that the resulting tube portion is also tapered, i.e. with a varying diameter over its length. A special example of this is the concave tube portion which has a larger diameter at the open ends and a small diameter in the middle. FIG. 5 shows a tube portion which is one half of a concave tube. Two tube portions as presented in FIG. 5 (one mirrored) will at the left hand side of FIG. 5 connect to form a concave tube. A plurality of these concave tubes, each having a length of e.g. 30 m, will make up the tube for the ETT-system. In that case about 33 of these concave tubes will be needed for each km of ETT-system.

Figure 6:
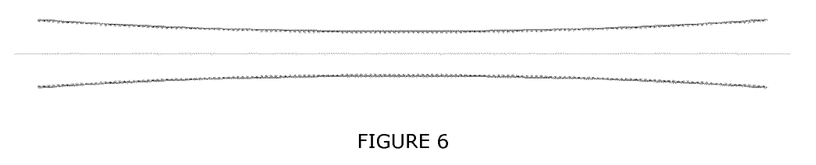
FIG. 6 shows a cross section in the axial direction of a concave tube portion.

FIG. 6 shows a cross section in the axial direction of such a concave tube portion. The tube portion can be made from 9 pressed prefabricated steel tube wall parts of 30 m long with flanges of 30 mm. The width varies between 1805 mm at the tangential edges 4, 5 and 1177 mm in the middle. A specific concave tube portion is the catenoid or hyperboloid.

A catenoid is a type of surface in topology, arising by rotating a catenary curve about an axis. It is a minimal surface, meaning that it occupies the least area when bounded by a closed space.

Figure 7:
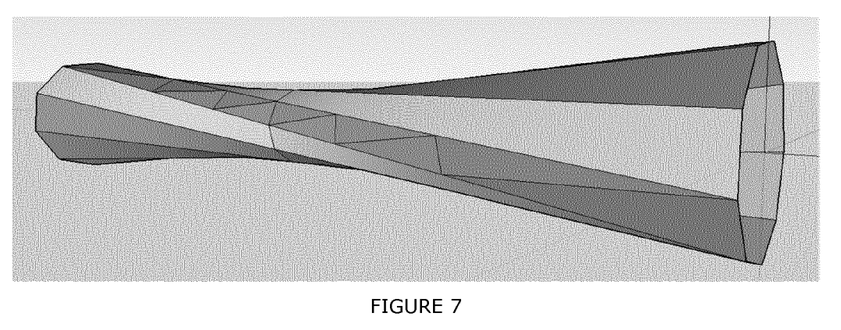
FIG. 7 shows a concave tube portion constructed by connecting two tube segments in the middle in the centre joint.

FIG. 7 shows a different way to construct a concave tube portion by connecting two tube segments in the middle in the centre joint. The prefabricated steel tube wall parts are provided with kinks by press breaking the quadrangular portion into specifically dimensioned triangles to allow producing the hyperbolic or catenoid shape of the tube segment.

Figure 8:
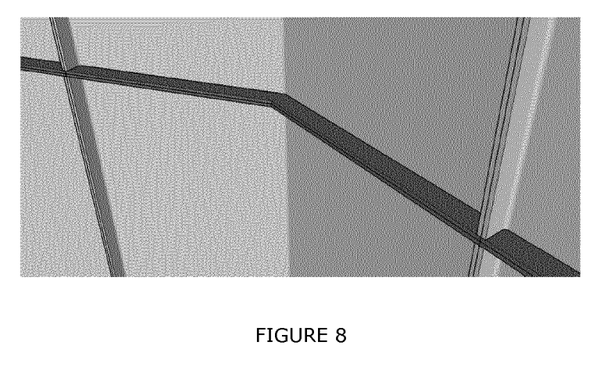
FIG. 8 shows a tangential stiffening ring in the interior of the tube segment.

FIG. 8 shows a tangential stiffening ring in the interior of the tube segment. This ring is drawn relatively small, but it can be significantly thicker or larger so as to provide more strengthening and stiffening. If this ring is provided at the edge 4, 5 of the quadrangular portion, then it may serve as a flange connectable by welding or bolting to the flange of the abutting quadrangular portion of the next tube portion.

FIG. 9 shows the situation where the abutting prefabricated steel tube wall parts are both provided with flanges 8, and wherein the arrows indicate potential welding spots.

Figure 10:
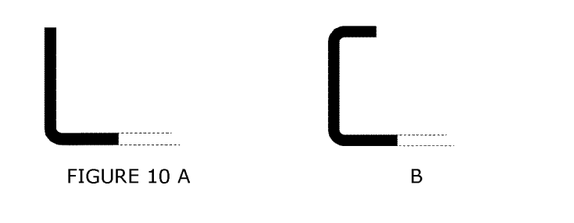
FIG. 10A shows a schematic form of an upstanding flange.
FIG. 10B shows a schematic form of an upstanding flange with an additional flange under about 90°.

FIG. 10A shows a schematic form of an upstanding flange 8. FIG. 10B shows a schematic form of an upstanding flange 8 with an additional flange under about 90°.

Figure 11:
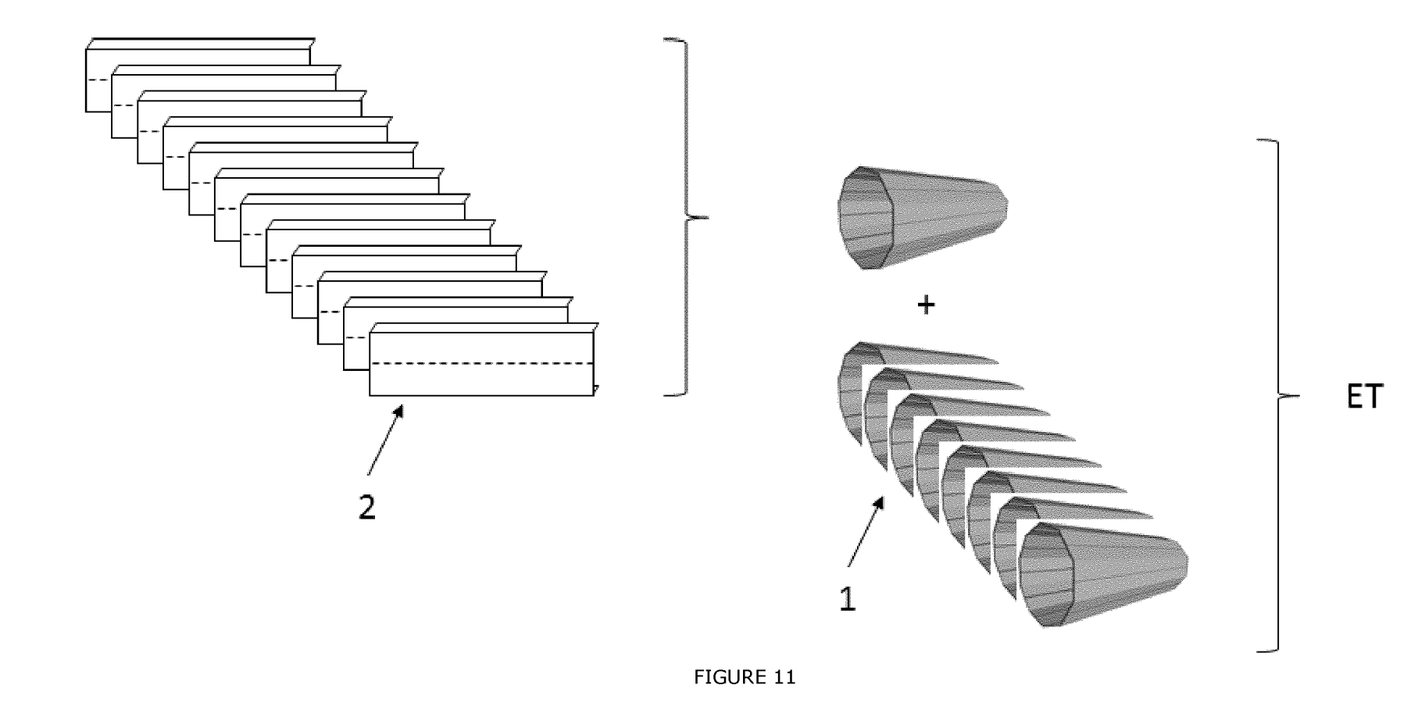
FIG. 11 shows the building of a tube for an ETT-system from a plurality of tube segments.

FIG. 11 shows the building of a tube for an ETT-system from a plurality of tube segments 1 which are in turn produced from a plurality of prefabricated steel tube wall parts 2. In its simplest form the tube segments have a constant cross section and diameter and thus the tube for an ETT-system also has a constant cross section and diameter. In a more complicated case the tube segments have a non-constant cross section and diameter consequently the tube for an ETT-system also gas a non-constant cross section and diameter, for instance if the tube segments produce individual concave tube portions which are linked together to form a tube for the ETT-system.

Figure 12:
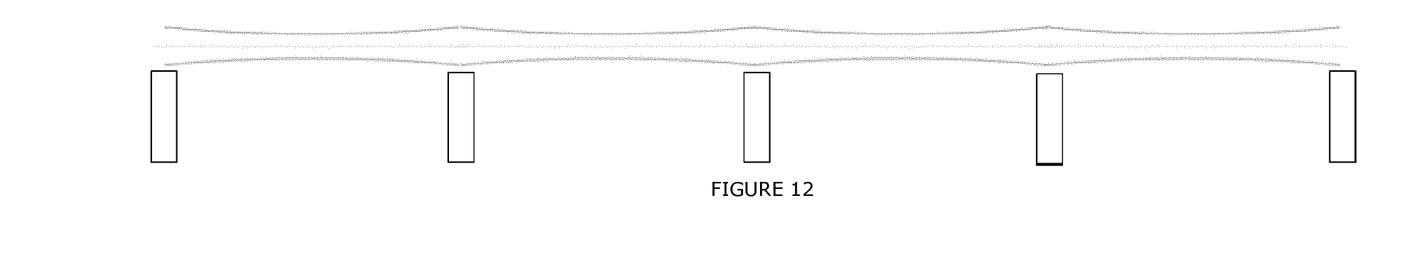
FIG. 12 shows a part of a tube for an ETT-system consisting of 4 concave tube portions.

FIG. 12 shows a part of a tube for an ETT-system consisting of 4 concave tube portions, in this case supported by pillars of sort at the point where the tube portions are connected.

The invention claimed is:

1. An evacuated tube transport system tube which is adapted and configured for near vacuum use, comprising a plurality of tube segments, wherein the tube segments have an exterior side and an interior side,
    wherein each tube segment is composed of a plurality of prefabricated steel tube wall parts,
    wherein the parts comprise an essentially quadrangular portion having an outwardly facing surface in the direction of the exterior of the tube segment and an inwardly facing surface in the direction of the interior of the tube segment,
    said portion having two tangential edges and two axial edges, wherein at least the axial edges are provided with flanges along one or both edges.

2. The tube comprising tube segments according to claim 1 wherein
    all flanges of the prefabricated steel tube wall parts extend towards the interior side of the tube segment, or wherein
    all flanges of the prefabricated steel tube wall parts extend towards the exterior side of the tube segment, or wherein
    some of the flanges of the prefabricated steel tube wall parts extend towards the interior side of the tube segment and the other flanges extend towards the exterior side of the tube segment.

3. The tube comprising tube segments according to claim 1, wherein the length of the axial edges of the prefabricated steel tube wall parts is about 3 times larger than the width of the largest axial edge.

4. The tube comprising tube segments according to claim 1, wherein the axial edge of a prefabricated steel tube wall part is attached to the abutting axial edge of an adjacent prefabricated steel tube wall part by
    fastening means working on the flanges of the abutting prefabricated steel tube wall parts, or by
    welding the two abutting axial edges of the abutting prefabricated steel tube wall parts together and/or welding the flanges of the abutting prefabricated steel tube wall parts together.

5. The tube comprising tube segments according to claim 1, wherein the essentially quadrangular portion of the prefabricated steel tube wall parts is a rectangular, or wherein the essentially quadrangular portion of the prefabricated steel tube wall parts is an isosceles trapezium.

6. The tube comprising tube segments according to claim 1, wherein the essentially quadrangular portion of the prefabricated steel tube wall parts are curved so as to enable the tube to be substantially cylindrical or concave.

7. The tube comprising tube segments according to claim 1, wherein the quadrangular portion of the prefabricated steel tube wall parts is essentially flat.

8. The tube comprising tube segments according to claim 1, wherein the quadrangular portion of the prefabricated steel tube wall parts also comprises at least one additional stiffening rib extending essentially in the axial or in the tangential direction.

9. The tube comprising tube segments according to claim 1, wherein the tube is provided with additional stiffening means.

10. A method of producing an evacuated tube transport system tube according to claim 1 which, in use, is near vacuum, by connecting a plurality of tube segments, comprising the steps of:
    Producing a hot rolled steel strip by hot-rolling having a suitable thickness and properties for producing the prefabricated steel tube wall parts;
    Optionally pickling the hot rolled steel strip;
    Optionally providing the hot rolled steel strip with a metallic coating,
    Cutting a blank for producing the prefabricated steel tube wall parts from the hot rolled steel strip;
    Forming the blank into the prefabricated steel tube wall parts by providing the flanges on the axial edges, and
        providing the optional kink or kinks in the axial direction, and/or
        providing the optional curvature in the tangential direction and/or
        providing the optional stiffening rib or ribs in the axial direction, and
    Attaching the axial edges of prefabricated steel tube wall parts to the abutting axial edge of adjacent prefabricated steel tube wall parts to form a complete annular tube segment,
    Optionally providing the strip, prefabricated steel tube wall parts or tube segment with an organic coating.

11. A method of producing an evacuated tube transport system tube according to claim 1 which, in use, is near vacuum, with a non-constant diameter by connecting a plurality of tube segments comprising the steps of:
    Producing a hot rolled steel strip by hot-rolling having a suitable thickness and properties for producing the prefabricated steel tube wall parts:
    Optionally pickling the hot rolled steel strip:
    Optionally providing the hot rolled steel strip with a metallic coating,
    Cutting a blank for producing the prefabricated steel tube wall parts from the hot rolled steel strip:
    Forming the blank into the prefabricated steel tube wall parts by providing the flanges on the axial edges, and
        providing the optional kink or kinks in the axial direction, and/or
        providing the optional curvature in the tangential direction and/or
        providing the optional stiffening rib or ribs in the axial direction, and
    Attaching the axial edges of prefabricated steel tube wall parts to the abutting axial edge of adjacent prefabricated steel tube wall parts to form a complete annular tube segment,
    Optionally providing the strip, prefabricated steel tube wall parts or tube segment with an organic coating, wherein at least part of the tube segments has a non-constant diameter.

12. The method according to claim 10, wherein the blank is provided with curved axial edges, and wherein the blank is pressed into a curved shape provided with flanges on the axial edges to produce prefabricated steel tube wall parts that, after attaching the axial edges of prefabricated steel tube wall parts to the abutting axial edge of adjacent prefabricated steel tube wall parts forms a tapered tube segment suitable for producing a concave tube portion.

13. A method of use of the tube according to claim 1 in an ETT-system comprising applying near vacuum to an interior space of the tube and passing an object through the interior space of the tube in near vacuum.

14. The tube comprising tube segments according to claim 1, wherein the length of the axial edges of the prefabricated steel tube wall parts is more than 5 times larger than the width of the largest axial edge.

15. The tube comprising tube segments according to claim 1, wherein the length of the axial edges of the prefabricated steel tube wall parts is more than 10 times larger than the width of the largest axial edge.

16. The tube comprising tube segments according to claim 4, wherein the axial edge of a prefabricated steel tube wall part is attached to the abutting axial edge of an adjacent prefabricated steel tube wall part by said fastening means, wherein the fastening means comprise releasable fastening means comprising nuts and bolts.

17. The tube comprising tube segments according to claim 1, wherein the quadrangular portion of the prefabricated steel tube wall parts is essentially flat but also comprises at least one kink essentially in the axial direction.

18. The tube comprising tube segments according to claim 9, wherein the additional stiffening means comprise substantially tangential stiffening rings or stiffening parts.

19. The method of producing an evacuated tube transport system tube according to claim 11, wherein the tube portion with the non-constant diameter is a concave tube portion, and the tube portions are connected by welding or by bolting one tube segment to the next tube segment.

20. The method of producing an evacuated tube transport system tube according to claim 11, wherein the tube portion with the non-constant diameter is a catenoid tube portion, and the tube portions are connected by welding or by bolting one tube segment to the next tube segment.

* * * * *